US010655610B2

United States Patent
McGrath et al.

(10) Patent No.: US 10,655,610 B2
(45) Date of Patent: May 19, 2020

(54) WIRE RACES FOR WIND TURBINE BEARINGS

(71) Applicant: General Electric Company, Schenectady, NY (US)

(72) Inventors: Edward Lee McGrath, Greer, SC (US); Priyangu Chunilal Patel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 15/581,624

(22) Filed: Apr. 28, 2017

(65) Prior Publication Data

US 2018/0313337 A1 Nov. 1, 2018

(51) Int. Cl.

| | |
|---|---|
| *F16C 33/58* | (2006.01) |
| *F03D 80/70* | (2016.01) |
| *F16C 19/38* | (2006.01) |
| *F16C 19/18* | (2006.01) |
| *F16C 33/61* | (2006.01) |
| *F16C 19/26* | (2006.01) |
| *F16C 19/08* | (2006.01) |
| *F16C 19/16* | (2006.01) |

(52) U.S. Cl.
CPC .............. *F03D 80/70* (2016.05); *F16C 19/08* (2013.01); *F16C 19/18* (2013.01); *F16C 19/26* (2013.01); *F16C 19/38* (2013.01); *F16C 33/61* (2013.01); *F05B 2240/50* (2013.01); *F05B 2240/54* (2013.01); *F16C 19/166* (2013.01); *F16C 2226/62* (2013.01); *F16C 2300/14* (2013.01); *F16C 2360/31* (2013.01); *Y02E 10/721* (2013.01); *Y02E 10/722* (2013.01)

(58) Field of Classification Search
CPC ........ F16C 19/166; F16C 19/18; F16C 19/38; F16C 2300/14; F16C 33/61; F03D 80/70
See application file for complete search history.

(56) References Cited

U.S. PATENT DOCUMENTS

| | | | |
|---|---|---|---|
| 2,917,351 A | 12/1959 | Franke et al. | |
| 3,002,429 A | 10/1961 | Franke et al. | |
| 3,030,158 A * | 4/1962 | Pohler | F16C 19/10 |
| | | | 384/615 |
| 3,141,230 A | 7/1964 | Pohler et al. | |
| 3,144,278 A * | 8/1964 | Pohler | F16C 19/166 |
| | | | 384/493 |
| 3,208,804 A | 9/1965 | Stenert et al. | |
| 3,332,728 A | 7/1967 | Gibson | |
| 3,370,333 A | 2/1968 | Gibson | |

(Continued)

FOREIGN PATENT DOCUMENTS

| | | |
|---|---|---|
| EP | 301186 A1 | 2/1989 |
| EP | 2414704 B1 | 9/2013 |

(Continued)

*Primary Examiner* — Hai H Huynh
*Assistant Examiner* — Gonzalo Laguarda
(74) *Attorney, Agent, or Firm* — Dority & Manning, P.A.

(57) ABSTRACT

The present disclosure is directed to a bearing assembly for a wind turbine. The bearing assembly includes an outer race, an inner race rotatable relative to the outer race, a plurality of rolling elements positioned between the inner and outer races, and at least one wire race arranged with the plurality of rolling elements between the inner and outer races.

20 Claims, 11 Drawing Sheets

(56) References Cited

U.S. PATENT DOCUMENTS

| | | | |
|---|---|---|---|
| 3,370,337 A | 2/1968 | Gibson | |
| 3,453,673 A | 7/1969 | Arnot | |
| 3,478,402 A | 11/1969 | Schmude et al. | |
| 3,482,892 A * | 12/1969 | Pohler | F16C 19/166 384/615 |
| 3,543,367 A | 12/1970 | Arnot | |
| 3,608,661 A | 9/1971 | Arnot | |
| 3,700,845 A * | 10/1972 | Jonsson | F16C 19/166 384/569 |
| 3,709,573 A * | 1/1973 | Orkin | F16C 17/10 384/264 |
| 3,897,843 A | 8/1975 | Hapeman et al. | |
| 4,003,121 A | 1/1977 | Hagen et al. | |
| 4,007,560 A | 2/1977 | Janssen | |
| 4,074,394 A | 2/1978 | Kunig et al. | |
| 4,109,361 A | 8/1978 | Hagen et al. | |
| 4,262,991 A | 4/1981 | Wagener et al. | |
| 4,505,525 A | 3/1985 | Wolzenburg | |
| 4,509,871 A | 4/1985 | Herzog et al. | |
| 4,557,532 A | 12/1985 | Teramachi | |
| 4,568,205 A * | 2/1986 | Basener | F16C 19/166 384/501 |
| 4,648,728 A | 3/1987 | Erdelitsch et al. | |
| 4,778,287 A | 10/1988 | Jacob et al. | |
| 4,906,113 A | 3/1990 | Sague | |
| 4,989,999 A * | 2/1991 | Siemensmeyer | F16C 19/381 384/455 |
| 5,134,863 A | 8/1992 | Hanna | |
| 5,275,020 A | 1/1994 | Scherzinger | |
| 5,372,485 A * | 12/1994 | Sumser | F01D 17/14 415/166 |
| 5,428,864 A | 7/1995 | Pemberton | |
| 5,454,225 A * | 10/1995 | Sumser | F01D 9/045 415/166 |
| 5,581,969 A | 12/1996 | Kelleher | |
| 5,599,110 A * | 2/1997 | MacKendrick | A62B 17/001 2/2.12 |
| 8,196,900 B2 | 6/2012 | Kempf | |
| 8,197,145 B2 | 6/2012 | Neubert et al. | |
| 8,794,847 B2 | 8/2014 | Dondaine et al. | |
| 9,017,198 B2 | 4/2015 | Hoebel et al. | |
| 9,072,486 B2 | 7/2015 | Limmer et al. | |
| 9,140,342 B2 | 9/2015 | Hoebel et al. | |
| 9,590,468 B2 | 3/2017 | Ritchey et al. | |
| 2006/0120649 A1* | 6/2006 | Risberg | F16C 33/61 384/513 |
| 2010/0284640 A1* | 11/2010 | Bergling | F16C 33/61 384/490 |
| 2014/0252922 A1 | 9/2014 | Ritchey et al. | |
| 2015/0276036 A1 | 10/2015 | Hoebel et al. | |
| 2015/0306717 A1 | 10/2015 | Ehrhardt et al. | |
| 2016/0025068 A1* | 1/2016 | Frank | F16C 19/188 384/492 |

FOREIGN PATENT DOCUMENTS

| | | |
|---|---|---|
| EP | 2414704 B8 | 10/2013 |
| EP | 2672147 A2 | 12/2013 |
| WO | WO 00/78057 A1 | 12/2000 |
| WO | WO 2006/122642 A1 | 11/2006 |
| WO | WO 2009/048402 A1 | 4/2009 |
| WO | WO 2009/048403 A1 | 4/2009 |
| WO | WO 2010/113115 A2 | 10/2010 |
| WO | WO 2012/046216 A2 | 4/2012 |
| WO | WO 2013/108072 A2 | 7/2013 |

* cited by examiner

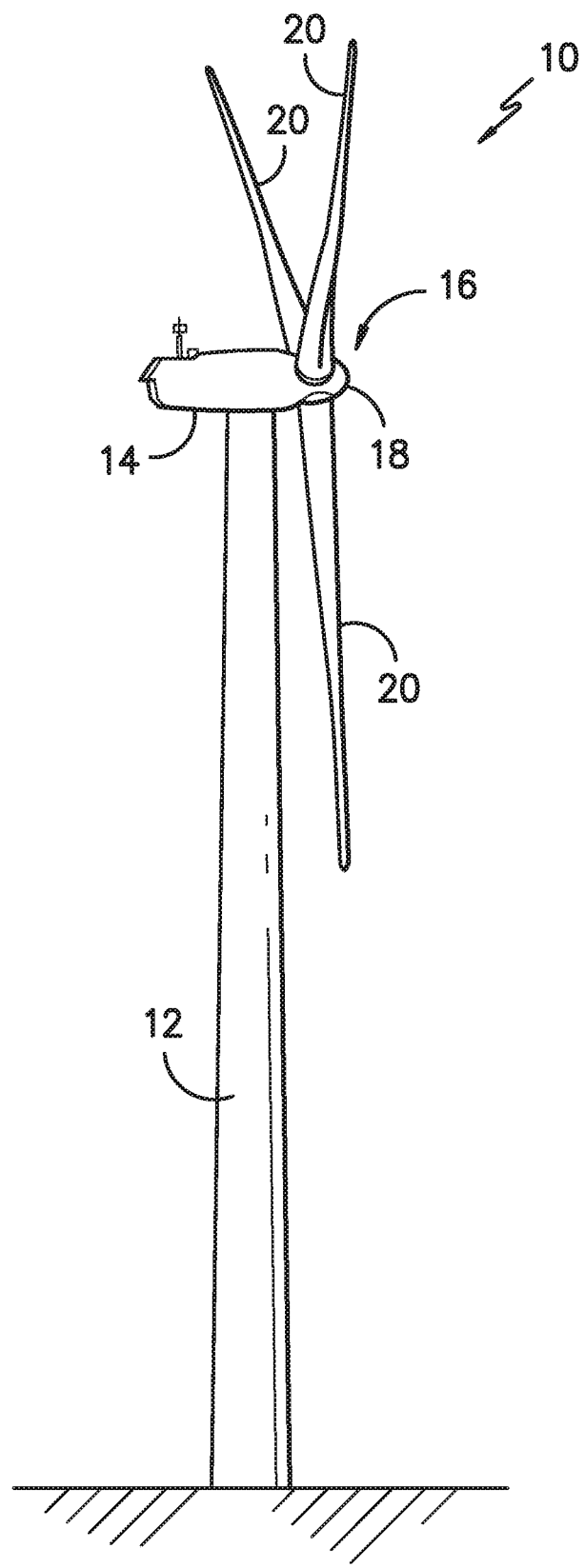
FIG. -1-

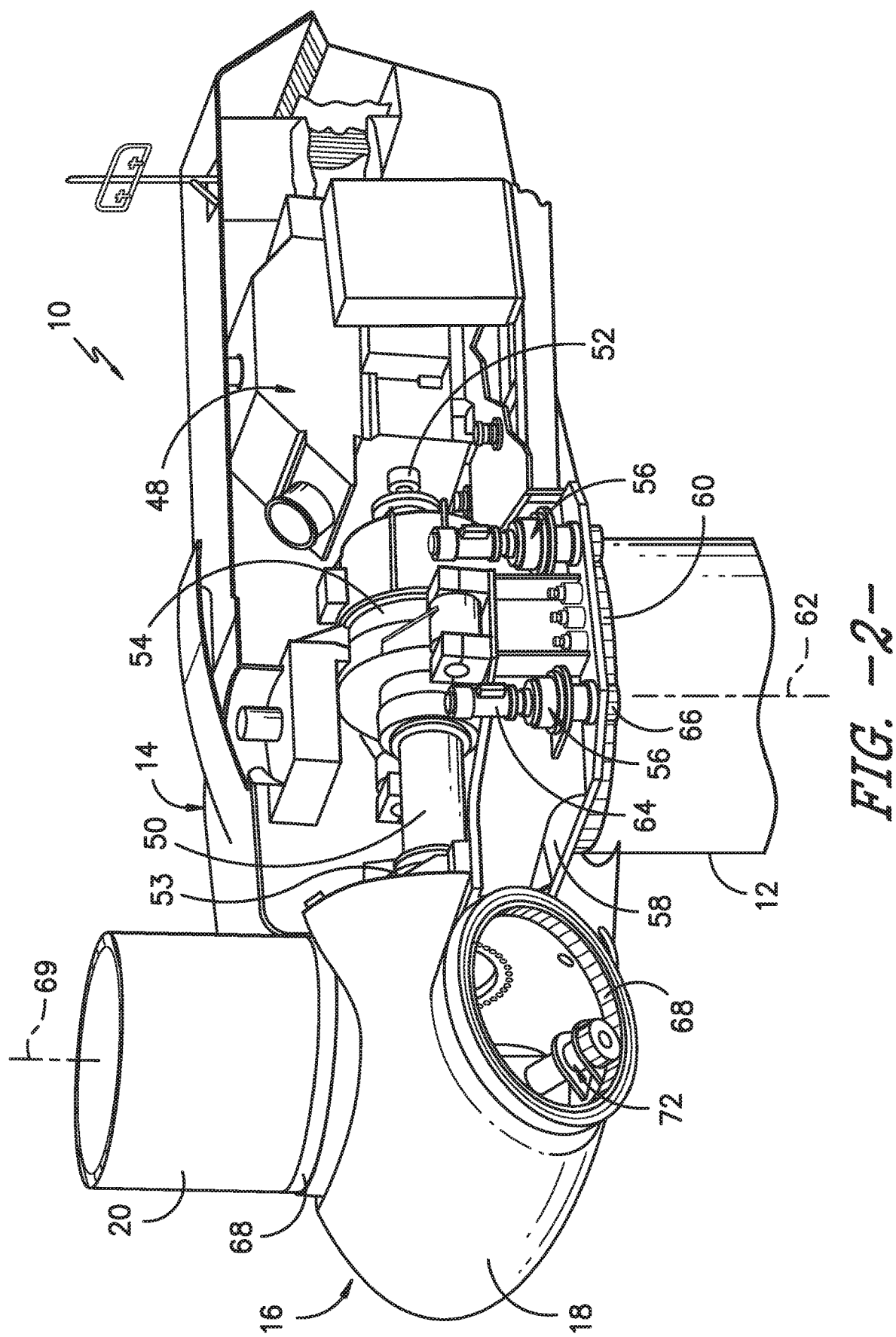
FIG. -2-

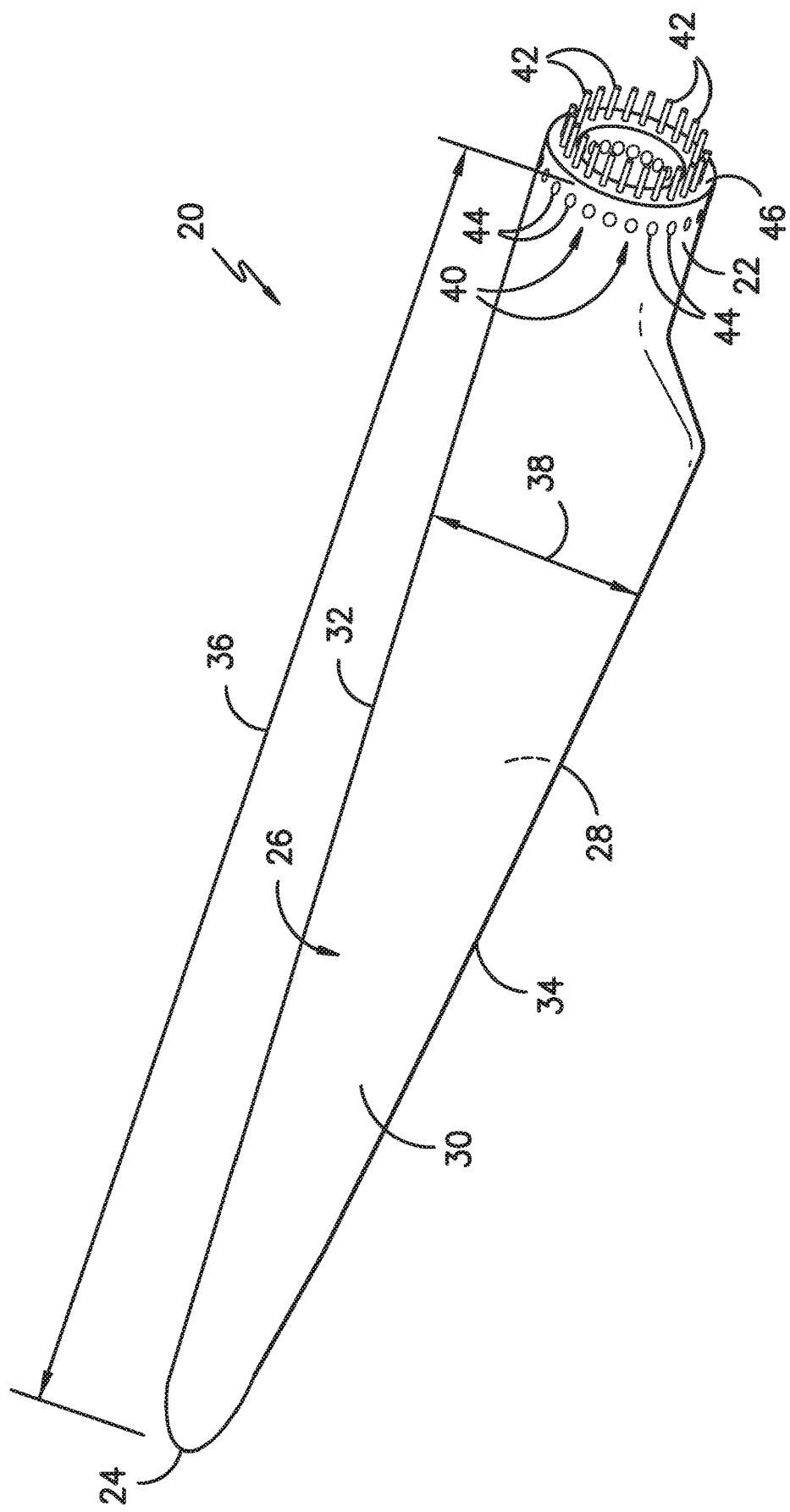
FIG. -3-

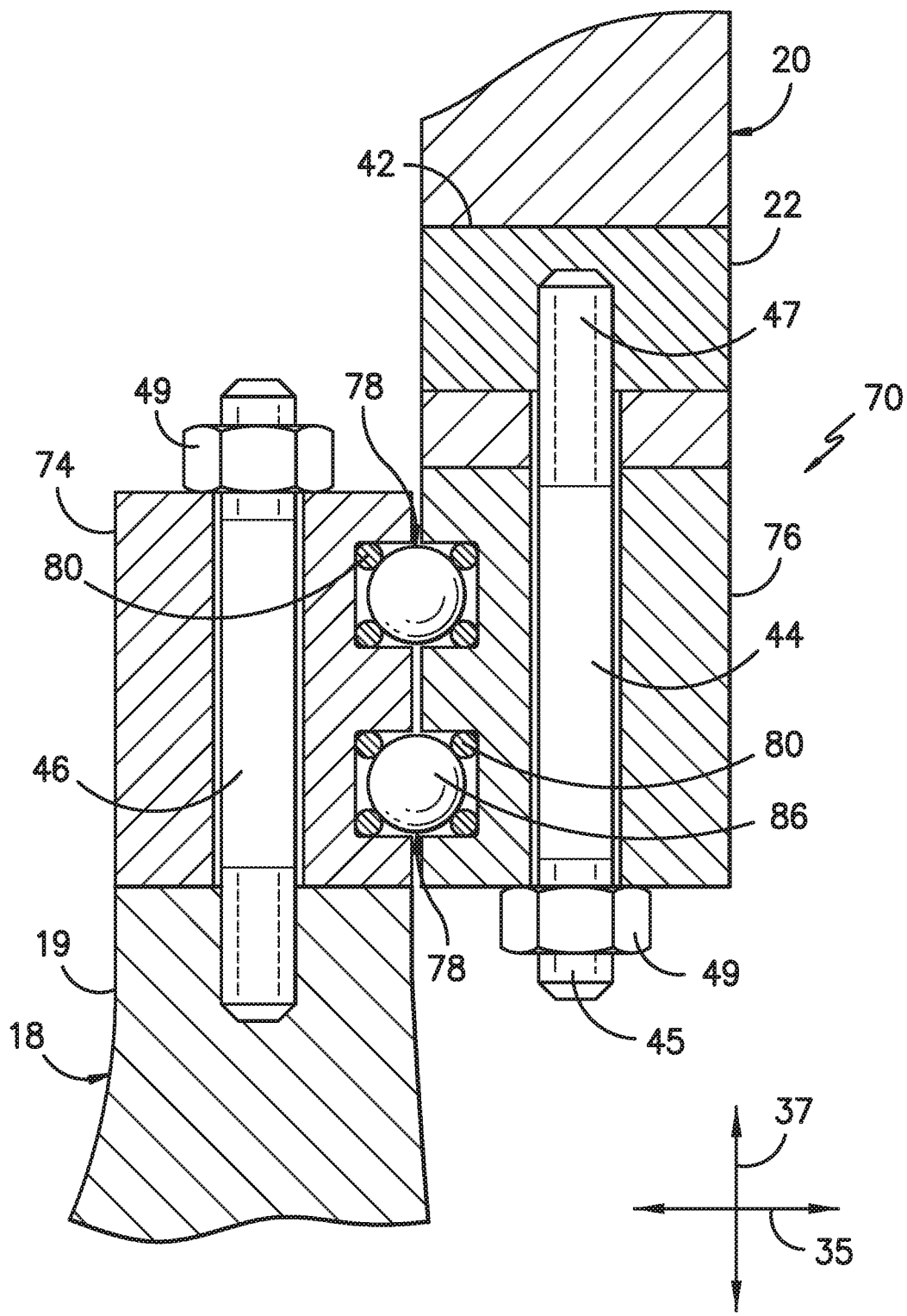
FIG. -4-

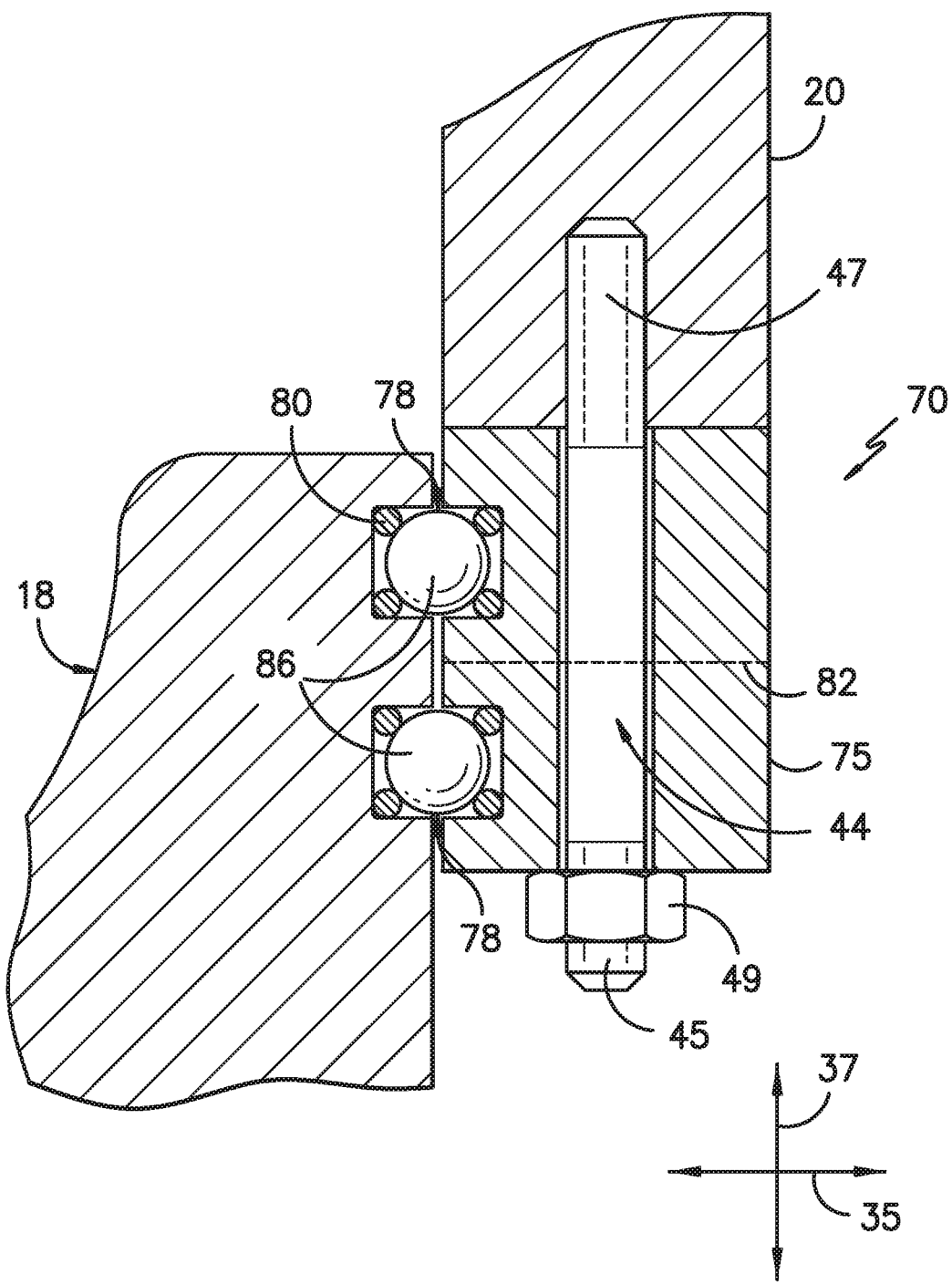
FIG. -5-

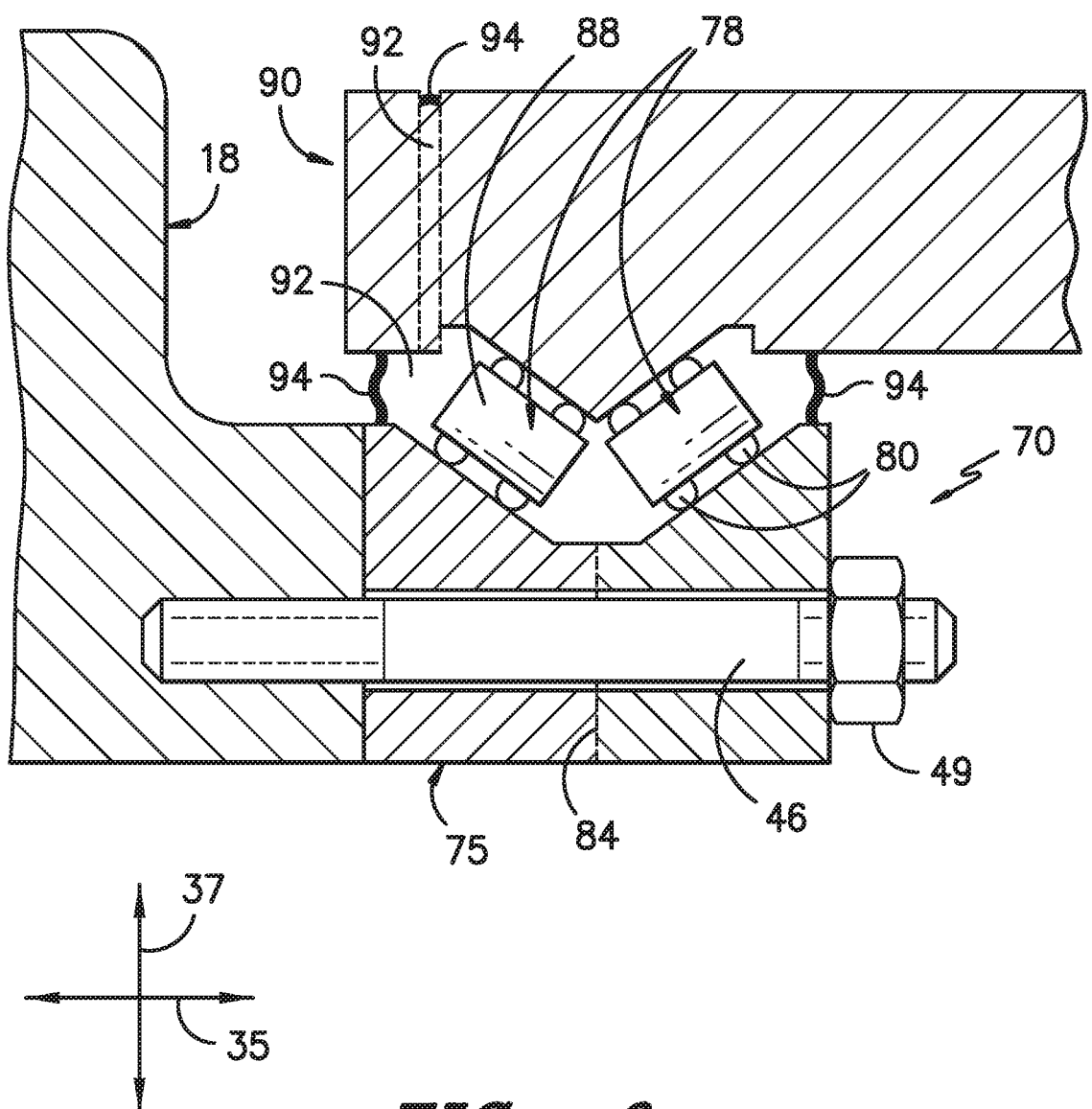
FIG. -6-

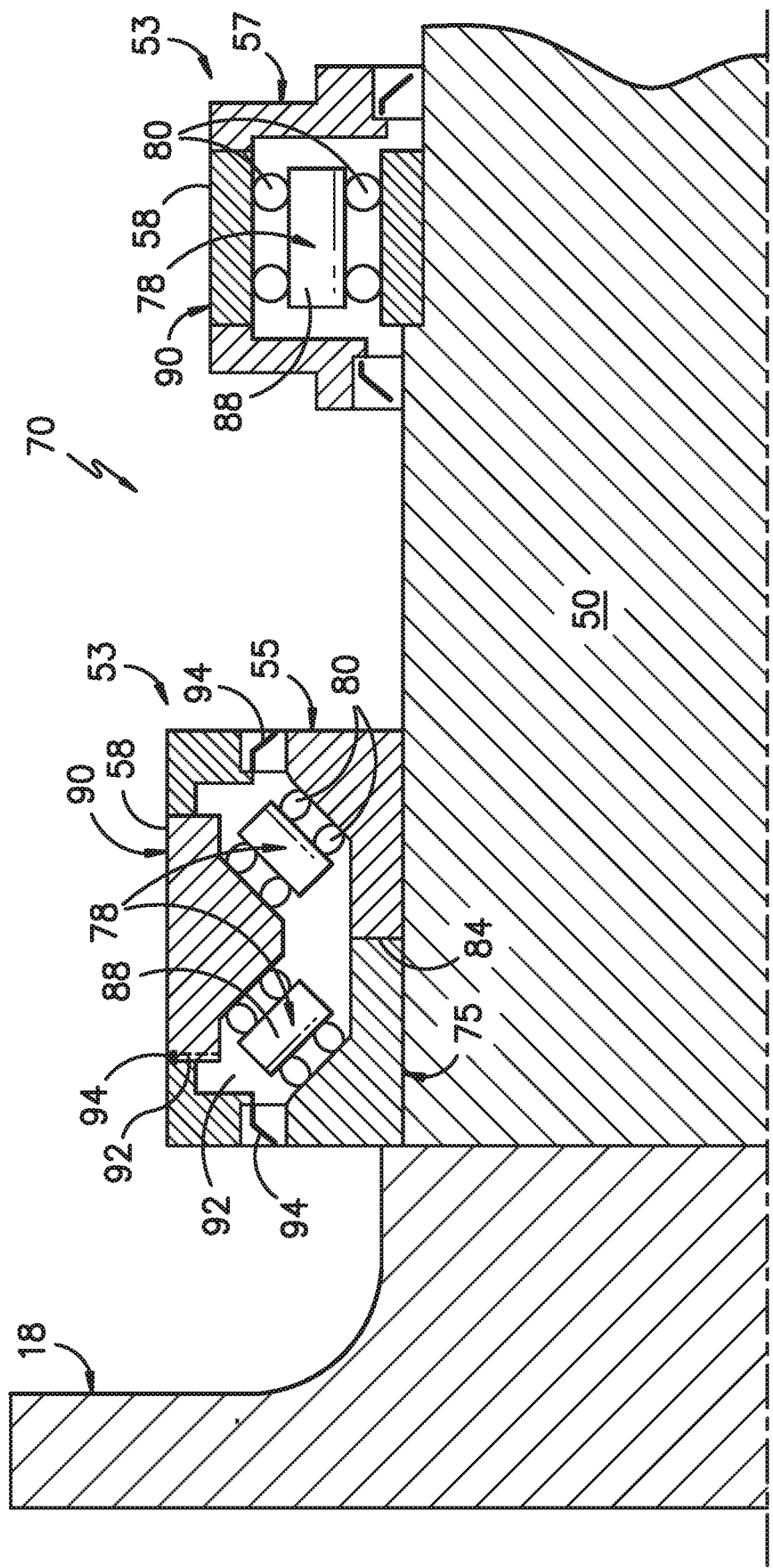
FIG. -7-

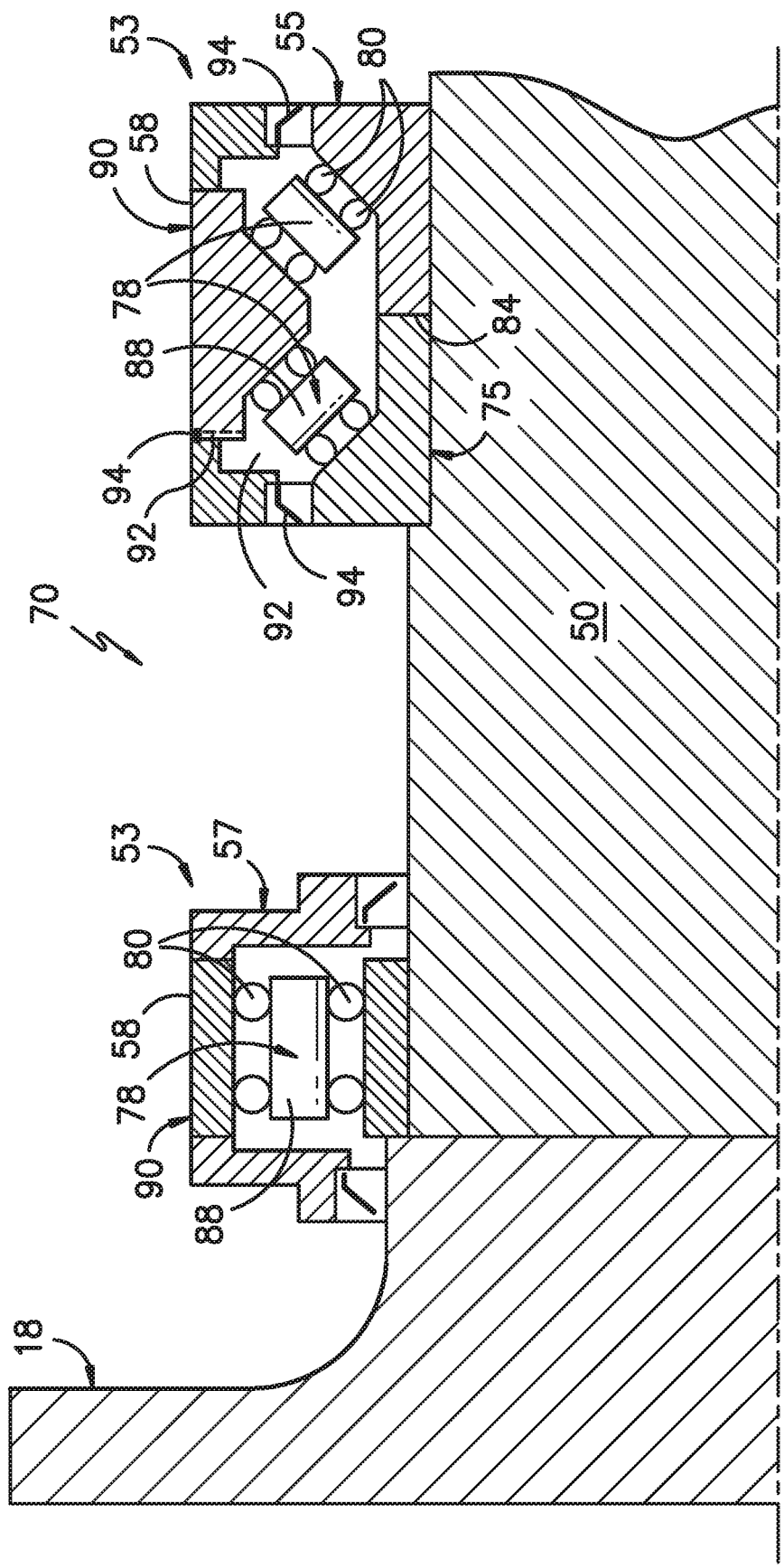
FIG. -8-

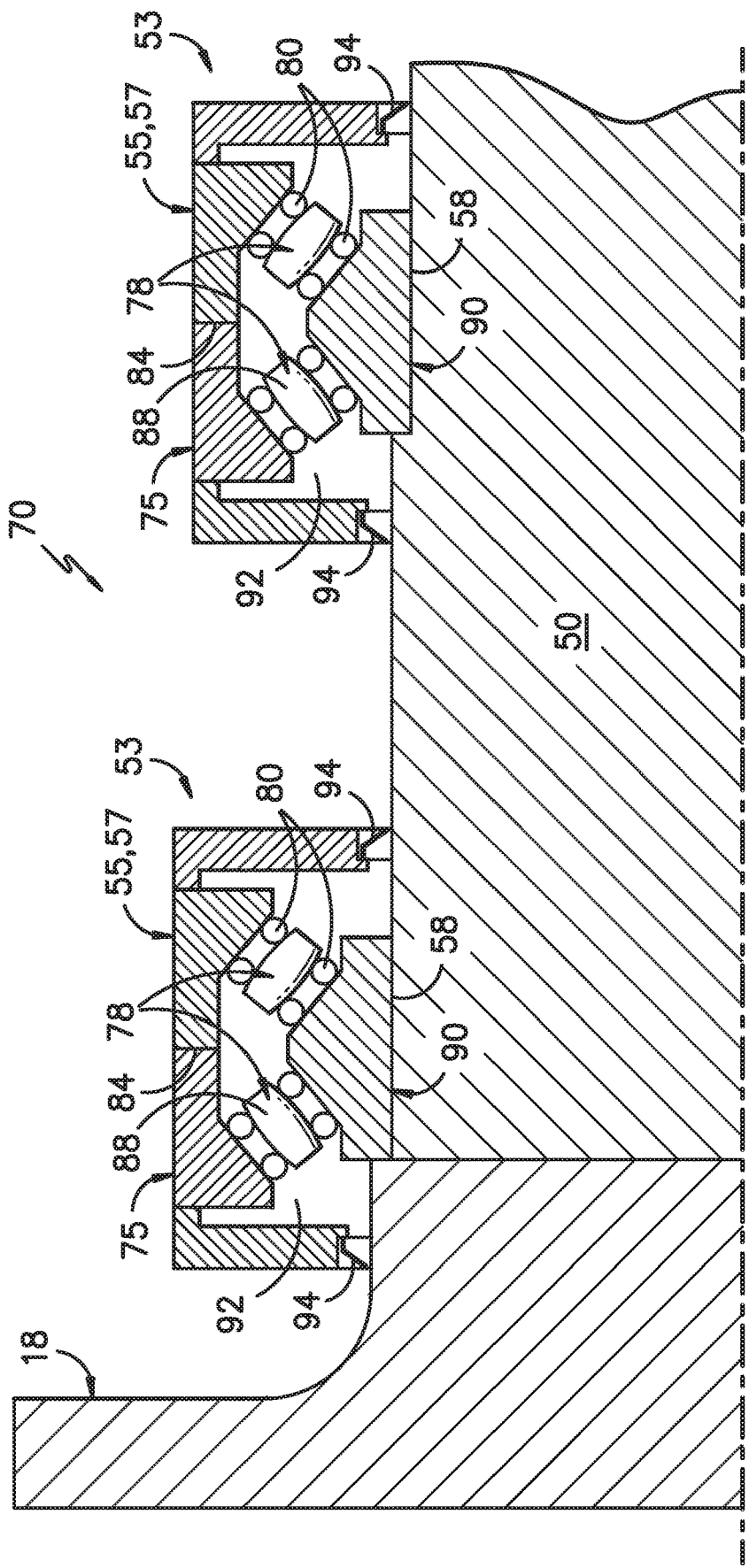
FIG. -9-

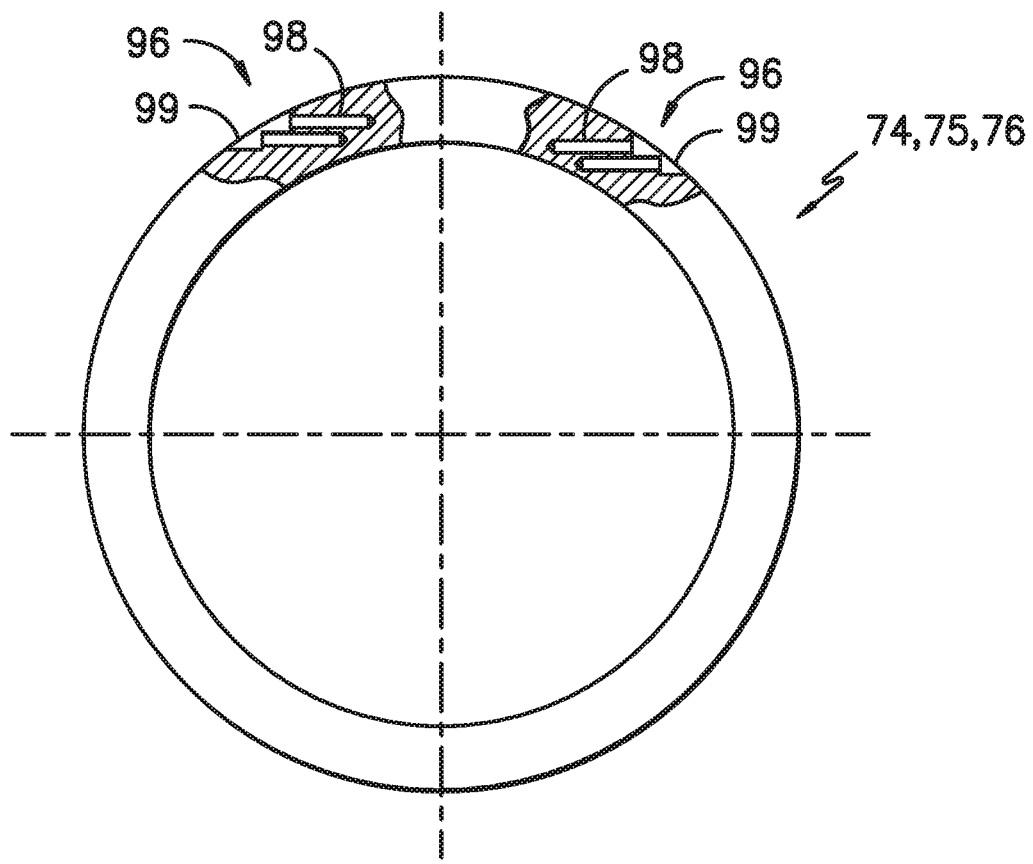
FIG. -10-
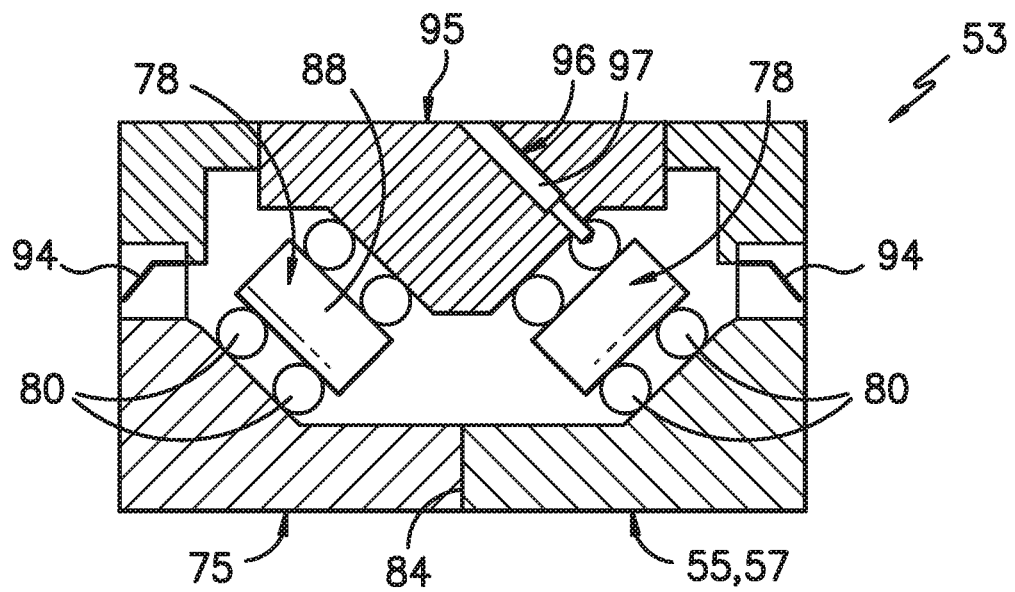
FIG. -11-

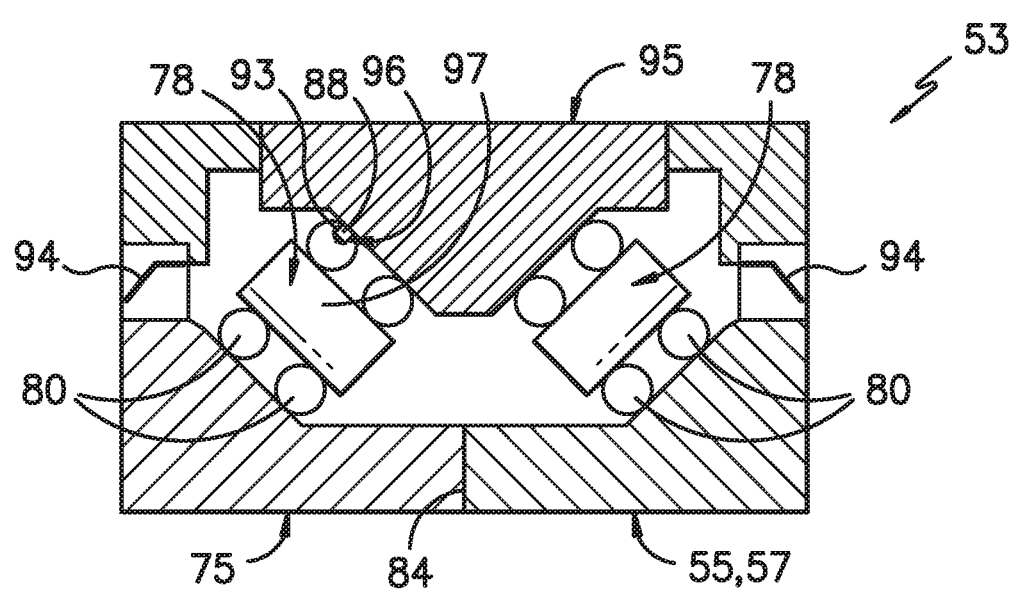
FIG. -12-

WIRE RACES FOR WIND TURBINE BEARINGS

FIELD OF THE INVENTION

The present subject matter relates generally to wind turbines and, more particularly, to bearings for wind turbines having wire races.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a main shaft coupling the rotor blades to a gearbox, or if a gearbox is not used, directly to the generator. The generator then converts the mechanical energy to electrical energy that may be deployed to a utility grid.

Modern wind turbines include many bearings to provide rotational movement of its various components. For example, to properly orient the nacelle and the rotor blades relative to the direction of the wind, wind turbines typically include one or more yaw and/or pitch bearings. Such bearings are typically slewing bearings which are rotational ball bearings that support a heavy but slow-turning or slow-oscillating load. Typical yaw and/or pitch bearings include an outer and inner race with a plurality of ball or roller bearings configured between the inner and outer races. As such, yaw bearings permit rotation of the nacelle and are mounted between the tower and the nacelle, whereas pitch bearings permit rotation of the rotor blades and are mounted between the rotatable hub and one of the rotor blades. In addition, wind turbines typically include one or more roller bearings configured with the main shaft to permit rotation thereof. Alternatively, in wind turbines without a main shaft, such roller bearings may be used to permit rotation of the hub with respect to the nacelle.

As wind turbines continue to increase in size, such bearings must similarly increase in size due to increased loading from longer rotor blades. With longer rotor blades also comes increased loads acting on the wind turbine bearings, which are typically very expensive and can be difficult to access and replace. In addition, increasing the size of such bearings and current materials of construction can limit manufacturing capabilities thereof, e.g. in materials and/or providing heat treatment thereto.

Accordingly, an improved bearing that addresses the aforementioned issues would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a bearing assembly for a wind turbine. The bearing assembly includes an outer race, an inner race, at least one row of a plurality of rolling elements positioned between the inner and outer races such that at least one of the inner race or the outer race rotates with respect to the other, and at least one wire race arranged with the plurality of rolling elements between the inner and outer races.

In one embodiment, the bearing assembly may include at least two wire races or at least four wire races arranged with the row of rolling elements, thereby forming a two-point or four-point contact bearing, respectively. In other embodiments, the plurality of rolling elements may include at least two rows of rolling elements. In such embodiments, the bearing assembly may include at least one wire race arranged with each of the at least two rows of rolling elements. More specifically, in certain embodiments, the bearing assembly may include at least four wire races arranged with each of the at least two rows of rolling elements, thereby forming an eight-point contact bearing.

In another embodiment, either or both of the inner or outer races may be radially split.

In further embodiments, the inner and outer races may be constructed of a first metal alloy, whereas the wire race(s) may be constructed of second metal alloy. More specifically, the second metal alloy may have at least one improved characteristic in comparison to the first metal alloy. For example, the second metal alloy may have a higher strength, an increased hardness, or improved contact fatigue capability than the first metal alloy. In further embodiments, the wire race(s) may optionally include a coating. In addition, it should be understood that the wire race(s) may have any suitable a cross-sectional shape, including but not limited to a circle, a square, an oval, a crescent shape, a hemispherical shape, a rectangle, or similar.

In several embodiments, the bearing assembly may further include a wire-retention feature configured to prevent the at least one wire race from rotating.

In additional embodiments, the bearing assembly may correspond to a pitch bearing or a yaw bearing of the wind turbine. In another embodiment, the plurality of rolling elements may include ball bearings or roller bearings.

In another aspect, the present disclosure is directed to a bearing assembly for a wind turbine. The bearing assembly includes a stationary component of the wind turbine, an annular race rotatable relative to the stationary component, a plurality of rolling elements positioned between the stationary component and the annular race, and at least one wire race arranged with the plurality of rolling elements between the stationary component and the annular race.

In one embodiment, the stationary component may be a hub or a tower of the wind turbine. It should be further understood that the bearing assembly may further include any one of or a combination of the features and/or embodiments as described herein.

In yet another aspect, the present disclosure is directed to a bearing assembly for a wind turbine. The bearing assembly includes a stationary component of the wind turbine, a rotatable component of the wind turbine rotatable relative to the stationary component, an annular race fixed relative to the rotatable component, a plurality of roller bearings positioned adjacent to the rotatable component, and at least one wire race arranged with the plurality of roller bearings.

In one embodiment, the annular race may be integrated with the rotatable component. In another embodiment, the rotatable component may include a hub of the wind turbine, whereas the stationary component may include a housing of the wind turbine. It should be further understood that the bearing assembly may further include any one of or a combination of the features and/or embodiments as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, internal view of the nacelle of the wind turbine shown in FIG. 1

FIG. 3 illustrates a perspective view of one of the rotor blades of the wind turbine shown in FIG. 1;

FIG. 4 illustrates a cross-sectional view of one embodiment of the bearing assembly configured as a pitch bearing with inner and outer races configured between the hub and rotor blade of the wind turbine according to the present disclosure;

FIG. 5 illustrates a cross-sectional view of another embodiment of the bearing assembly configured as a pitch bearing with the outer race being integrated in the hub of the wind turbine according to the present disclosure;

FIG. 6 illustrates a cross-sectional view of one embodiment of the bearing assembly configured as a main bearing of a three-point mount wind turbine according to the present disclosure;

FIG. 7 illustrates a cross-sectional view of another embodiment of the bearing assembly configured as two main bearings of a four-point mount wind turbine according to the present disclosure, particularly illustrating a fix bearing and a float bearing;

FIG. 8 illustrates a cross-sectional view of yet another embodiment of the bearing assembly configured as two main bearings of a four-point mount wind turbine according to the present disclosure, particularly illustrating a fix bearing and a float bearing;

FIG. 9 illustrates a cross-sectional view of still another embodiment of the bearing assembly configured as two main bearings of a four-point mount wind turbine according to the present disclosure, particularly illustrating two bearings that can be configured as either fix bearings or float bearings;

FIG. 10 illustrates a top view of one embodiment of one of the annular races of the bearing assembly according to the present disclosure, particularly illustrating the race having a hole configured to receive the wire race therein;

FIG. 11 illustrates a partial cross-sectional view of one embodiment of the bearing assembly configured as a main bearing of a wind turbine according to the present disclosure, particularly illustrating a wire-retention feature configured with one of the wire races; and FIG. 12 illustrates a partial cross-sectional view of another embodiment of the bearing assembly configured as a main bearing of a wind turbine according to the present disclosure, particularly illustrating a wire-retention feature configured with one of the wire races.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a bearing assembly for a wind turbine having at least one wire race. As such, the bearing assembly of the present disclosure provides numerous advantages not present in the cited art. For example, the wire races of the present disclosure provide raceway surfaces that can be made from a high-strength bearing steel or other specialized material, such that improved reliability of the bearing can be achieved with minimum high-cost material, i.e. the inner and/or outer races can be made from lower cost material and can be sized for maximum stiffness. The resultant bearing assembly is more economical than conventional bearings. Further, the wire races provide stiffer bearing raceways that better distribute rotor loads across the ball or roller bearings and help reduce contact stress, thereby improving bearing reliability. Moreover, the bearing assembly of the present disclosure can handle increased loads due to larger rotor blades without requiring larger ball bearings or more expensive roller bearings.

The present invention is described herein as it may relate to wind turbine bearings, including, at least, yaw bearings, pitch bearings, main bearings, and/or similar. It should be appreciated, however, that the unique bearings in accordance with principles of the present invention is not limited to use with a wind turbine, but is applicable to any suitable bearing application.

Referring now to the drawings, FIG. 1 illustrates a perspective view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 224 (FIG. 2) positioned within the nacelle 14 to permit electrical energy to be produced.

Referring now to FIG. 2, a simplified, internal view of one embodiment of the nacelle 14 of the wind turbine 10 shown in FIG. 1 is illustrated. As shown, a generator 48 may be disposed within the nacelle 16. In general, the generator 48 may be coupled to the rotor 16 of the wind turbine 10 for generating electrical power from the rotational energy generated by the rotor 16. For example, the rotor 16 may include a rotor shaft 50 coupled to the hub 18 for rotation therewith, e.g. via a main bearing 53. The generator 48 may then be coupled to the rotor shaft 50 such that rotation of the rotor shaft 50 drives the generator 48. For instance, in the illustrated embodiment, the generator 48 includes a generator shaft 52 rotatably coupled to the rotor shaft 50 through a gearbox 54. However, in other embodiments, it should be appreciated that the generator shaft 52 may be rotatably coupled directly to the rotor shaft 50. Alternatively, the generator 48 may be directly rotatably coupled to the rotor shaft 50 (often referred to as a "direct-drive wind turbine").

Additionally, the wind turbine 10 may include one or more yaw drive mechanisms 56 mounted to and/or through a bedplate 58 positioned atop the wind turbine tower 12. Specifically, each yaw drive mechanism 56 may be mounted to and/or through the bedplate 58 so as to engage a yaw bearing 60 coupled between the bedplate 58 and the tower 12 of the wind turbine 10. The yaw bearing 60 may be mounted to the bed plate 58 such that, as the yaw bearing 60 rotates about a yaw axis 62 of the wind turbine 10, the bedplate 58 and, thus, the nacelle 14 are similarly rotated about the yaw axis.

In general, it should be appreciated that the yaw drive mechanisms 56 may have any suitable configuration and may include any suitable components known in the art that allow such mechanisms 56 to function as described herein. For example, as shown in FIG. 2, each yaw drive mechanism 56 may include a yaw motor 64 mounted to the bedplate 58. The yaw motor 64 may be coupled to a yaw gear 66 (e.g., a pinion gear) configured to engage the yaw bearing 60. For instance, the yaw motor 64 may be coupled to the yaw gear 66 directly (e.g., by an output shaft (not shown) extending through the bedplate 58) or indirectly through a suitable gear assembly coupled between the yaw motor 64 and the yaw gear 66. As such, the torque generated by the yaw motor 64 may be transmitted through the yaw gear 66 and applied to the yaw bearing 60 to permit the nacelle 14 to be rotated about the yaw axis 62 of the wind turbine 10. It should be appreciated that, although the illustrated wind turbine 10 is shown as including two yaw drive mechanisms 56, the wind turbine 10 may generally include any suitable number of yaw drive mechanisms 56. Similarly, it should be appreciated that the yaw bearing 60 may generally have any suitable configuration, including one or more of the bearing configurations described below.

Referring still to FIG. 2, the wind turbine 10 may also include a plurality of pitch bearings 68, with each pitch bearing 68 being coupled between the hub 18 and one of the rotor blades 20. As will be described below, the pitch bearings 68 may be configured to allow each rotor blade 20 to be rotated about its pitch axis 69 (e.g., via a pitch adjustment mechanism), thereby allowing the orientation of each blade 20 to be adjusted relative to the direction of the wind. It should be appreciated that, as used herein, the term "slewing bearing" may be used to refer to the yaw bearing 60 of the wind turbine 10 and/or one of the pitch bearings 68 of the wind turbine 10 or any other similar bearing.

Referring now to FIG. 3, a perspective view of one of the rotor blades 20 shown in FIGS. 1 and 2 is illustrated in accordance with aspects of the present subject matter. As shown, the rotor blade 20 includes a blade root 22 configured for mounting the rotor blade 20 to the hub 18 of a wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via one of the pitch bearings 68), as will be described in greater detail below.

Referring now to FIGS. 4-9, various embodiments of a bearing assembly 70 according to the present disclosure are illustrated. FIG. 4 illustrates a cross-sectional view of one embodiment of the bearing assembly 70 configured as a pitch bearing 68 with inner and outer races 74, 76 configured between the hub 18 and rotor blade 22 of the wind turbine. FIG. 5 illustrates a cross-sectional view of another embodiment of the bearing assembly 70 configured as a pitch bearing 68 with the outer race being integrated in the hub 18 of the wind turbine 10. FIG. 6 illustrates a cross-sectional view of still another embodiment of the bearing assembly 70 configured as a main bearing 53 of a three-point mount wind turbine. FIGS. 7-9 illustrates cross-sectional views of yet another embodiment of the bearing assembly 70 configured as two main bearings 53 of a four-point mount wind turbine. In further embodiments, the bearing assembly 70 may also be configured as a yaw bearing 60 of the wind turbine 10.

Referring particularly to FIG. 4, a partial, cross-sectional view of the bearing assembly 70 configured as a pitch bearing that is connected between the rotor blade 20 and the hub 18 according to the present disclosure is illustrated. More specifically, as shown, the bearing assembly 70 includes an outer race 74, an inner race 76, and a plurality of rolling elements 78 disposed between the races 74, 76. For example, in one embodiment, as shown in FIGS. 4 and 5, the rolling elements 78 may be ball bearings 86. In alternative embodiments, as shown in FIGS. 6-9, the plurality of rolling elements 78 may include roller bearings 88 and/or spherical roller bearings, which will be discussed in more detail below. As such, the inner race 76 is rotatable relative to the outer race 74 via the rolling elements 78 (or vice versa). In addition, the bearing assembly 70 includes at least one wire race 80 arranged with the plurality of rolling elements 78 between the inner and outer races 74, 76.

Further, as shown in the embodiment of FIG. 4, the inner race 76 may generally be configured to be mounted to a hub flange 19 of the hub 18 using a plurality of hub bolts 46 and/or other suitable fastening mechanisms. Similarly, the outer race 74 may be configured to be mounted to the blade root 22 using the root bolts 44 of the root attachment assemblies 40. For example, as shown, each root bolt 44 may extend between a first end 45 and a second end 47. As such, the first end 45 may be configured to be coupled to a portion of the inner race 76, such as by coupling the first end 45 to the inner race 76 using an attachment nut 49 and/or other suitable fastening mechanism. The second end 47 of each root bolt 44 may be configured to be coupled to the blade root 22 via the barrel nut 42 of each root attachment assembly 40.

Such relative rotation of the outer and inner races 74, 76 may be achieved using a pitch adjustment mechanism 72 (FIG. 2), for example, mounted within a portion of the hub 18. In general, the pitch adjustment mechanism 72 may include any suitable components and may have any suitable configuration that allows the mechanism to function as described herein. For example, in certain embodiments, the pitch adjustment mechanism may include a pitch drive motor (e.g., an electric motor), a pitch drive gearbox, and a pitch drive pinion. In such an embodiment, the pitch drive motor may be coupled to the pitch drive gearbox so that the motor imparts mechanical force to the pitch drive gearbox. Similarly, the pitch drive gearbox may be coupled to the pitch drive pinion for rotation therewith. The pinion may, in turn, be in rotational engagement with one of the outer and inner races 74, 76. For example, a plurality of gear teeth may be formed along the inner circumference of the one of the outer and inner races 74, 76 with the gear teeth being configured to mesh with corresponding gear teeth formed on the pinion. Thus, due to meshing of the gear teeth, rotation of the pitch drive pinion results in rotation of inner race 76 relative to the outer race 74 and, thus, rotation of the rotor blade 20 relative to the hub 18.

As shown in FIGS. 4 and 5, the rolling elements 78 described herein may include multiple rows, for example, a first row of rolling elements and a second row of rolling elements aligned in an axial direction 37. Further, as shown in FIG. 6, the first and second rows of rolling elements 78 may be aligned in a radial direction 35. In addition, any suitable number of rolling elements 78 may be employed and arranged in any suitable configuration. For example, in one embodiment, a single row or multiple, axially-spaced rows of rolling elements 78 may be utilized in the bearing assembly 70 to provide additional strength. For example, in various embodiments, three or more rows of rolling elements 78 may be employed.

Thus, as shown in FIG. 4, the bearing assembly 70 includes at least one wire race 80 arranged with each of the at least two rows of rolling elements 78. More specifically, as shown in the illustrated embodiment, the bearing assembly 70 may include at least four wire races 80 arranged with each row of rolling elements 78. As such, FIG. 4 illustrates an eight-point contact bearing assembly 70.

Referring now to FIG. 5, rather than having both outer and inner races 74, 76, the bearing assembly 70 may include a single annular race 75. More specifically, as shown, the bearing assembly 70 includes a stationary component of the wind turbine 10, an annular race 75 rotatable relative to the stationary component, a plurality of rolling elements 78 positioned between the stationary component and the annular race 75, and at least one wire race 80 arranged with the plurality of rolling elements 78 between the stationary component and the annular race 75. For example, as shown in FIG. 5, the stationary component may be the hub 18 of the wind turbine. In alternative embodiments, for example, where the bearing assembly 70 corresponds to a yaw bearing 60 of the wind turbine 10, the stationary component may be the tower 12 of the wind turbine 10.

Referring now to FIGS. 6-9, as mentioned, the bearing assembly 70 may be configured as the main bearing 53 of the wind turbine 10. For example, as shown, the main shaft 50 is supported by at least one main bearing 53 that is part of the bearing assembly 70. More specifically, as shown in FIGS. 7-9, the main shaft 50 may be supported by two main bearings 53. As such, when the main shaft 50 is supported using at least two main bearings 53 and is subjected to axial load, one of the bearings 53 resists the axial load. The bearing 53 that takes the axial load is referred to as the fix bearing 55, and the other bearing 53 is referred to as the float bearing 57. Thus, as shown, FIGS. 7-9 illustrate different arrangements of the fix and float bearings 55, 57.

Further, in such embodiments, as shown, the bearing assembly 70 includes a stationary component of the wind turbine 10, a rotatable component of the wind turbine 10, i.e. rotatable relative to the stationary component, an annular race 75 fixed relative to the rotatable component, a plurality of rolling elements 78 positioned adjacent to the rotatable component, and at least one wire race 80 arranged with the plurality of rolling elements 78. More specifically, as shown, the rolling elements 78 may correspond to roller bearings 88. In addition, the stationary component may correspond to a housing 90 of the wind turbine 10. For example, in certain embodiments, the housing 90 may correspond to the bedplate 58 or a pillow block 95 on the wind turbine 10. Further, as shown, the rotatable component may include the hub 18 of the wind turbine 10. In one embodiment, as shown, the annular race 75 may be secured to the hub 18 via any suitable mechanical fasteners (not shown). Alternatively, the annular race 75 may be integrated with the rotatable component, i.e. the hub 18.

In further embodiments, the race(s) 74, 75, 76 may be constructed of a first metal alloy, whereas the wire race(s) 78 may be constructed of second metal alloy. More specifically, the second metal alloy may have at least one improved characteristic in comparison to the first metal alloy. For example, the second metal alloy may have a higher strength, an increased hardness, or improved contact fatigue capability than the first metal alloy. More specifically, in one embodiment, the second metal alloy material may include 52100 alloy steel, whereas the first metal alloy may include a less expensive 42Cr alloy steel. As such, the bearing of the present disclosure provides improved reliability and cost benefits over bearings made of single materials.

In further embodiments, the wire race(s) may optionally include a coating. For example, the coating may include any suitable coating material, including but not limited to black oxide, diamond-like carbon (DLC) and equivalents thereof, and/or a phosphate based coating. In addition, it should be understood that the wire race(s) may have any suitable a cross-sectional shape, including but not limited to a circle, a square, an oval, a crescent shape, a hemispherical shape, a rectangle, or similar.

In another embodiment, the race(s) 74, 75, 76 described herein may have a split configuration, e.g. to help with assembly of the bearing 68. More specifically, as shown in FIG. 5, either or both of the race(s) 74, 75, 76 may be radially split as indicated by dotted line 82. Further, as shown in FIG. 6, where the bearing assembly 70 is configured as a main bearing of the wind turbine 10, the annular race 75 may be similarly split as indicated by dotted line 84.

Additionally, in several embodiments, a plurality of lubrication ports 92 may be defined through the race(s) 74, 75, 76. In general, each lubrication port 92 may be configured to supply a suitable lubricant (e.g., grease, etc.) from a location outside the bearing assembly 70 to a location between the race(s) 74, 75, 76. In addition, to maintain the lubricant within the bearing assembly 70, any gaps defined between the race(s) 74, 75, 76 may be sealed using suitable sealing mechanisms. For instance, as shown in FIG. 6, the bearing assembly 70 may include one or more sealing mechanisms 94 configured between the race(s) 74, 75, 76 so as to maintain the lubricant within the bearing assembly 70.

Referring now to FIGS. 10-12, various views of the bearing assembly 70 of the present disclosure are provided to particularly illustrate a wire retention feature 96, that is, for retaining the one or more wire race 80 in place during operation of the bearing. More specifically, FIG. 10 illustrates a top view of one embodiment of one of the annular races 74, 75, 76 of the bearing assembly 70 according to the present disclosure, particularly illustrating the annular race 74, 75, 76 having a tangential hole 98 configured to receive the wire race 80 therein. For example, as shown, the tangential holes 98 extend from an outer surface of the race to inside the bearing cavity to allow for feeding of the wire race(s) 80. In addition, as shown, the retention feature 96 may include a tap hole 99 on the outside surface of the annular race 74, 75, 76 to lock the wire race 80 inside the bearing.

Further, as shown in FIGS. 11 and 12, the bearing assembly 70 may include a reamed hole in the pillow block 95 and the wire race 80. Thus, as shown in FIG. 11, a dowel pin 97 can be inserted therein to prevent rotation of the wire race 80. Similar features can also be included in the cylindrical bearing. Alternatively, as shown in FIG. 12, the pillow block 95 may have an integral stop 93 configured to prevent the wire race 80 from spinning. The stop 93 may have any suitable shape, such as, for example, square (as shown), rectangular, arcuate, or similar.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a wind turbine, comprising;
an outer race;
an inner race, wherein at least one of the inner race or the outer race comprises a plurality of gear teeth;
a plurality of rolling elements positioned between the inner and outer races such that at least one of the inner race or the outer race rotates with respect to the other, the plurality of rolling elements comprising at least one row of rolling elements; and
at least two wire races arranged with the plurality of rolling elements between the inner and outer races, wherein the inner and outer races are constructed of a first steel alloy and the at least two wire races are constructed of second steel alloy, the second steel alloy having a higher strength and an increased hardness relative to respective characteristics of the first steel alloy.

2. The bearing assembly of claim 1, further comprising at least four wire races arranged with each of at least two rows of rolling elements, thereby forming an eight-point contact bearing.

3. The bearing assembly of claim 1, wherein at least one of the inner race or the outer race is radially split.

4. The bearing assembly of claim 1, wherein the at least two wire races comprise a cross-sectional shape, the cross-sectional shape comprising at least one of a square, an oval, a crescent shape, a hemispherical shape, or a rectangle.

5. The bearing assembly of claim 1, further comprising a wire-retention feature configured to prevent the at least two wire races from rotating, wherein the wire retention feature comprises a dowel pin.

6. A bearing assembly for a wind turbine, comprising;
a component of the wind turbine, wherein the component comprises one of a tower, a hub, or a housing of the wind turbine;
only a single annular race, wherein the annular race is rotatable relative to the component;
a plurality of rolling elements positioned between the component and the annular race; and
at least two wire races arranged with the plurality of rolling elements between the component and the annular race, wherein the at least one of the wire races and at least a portion of each rolling element of the plurality of rolling elements are received by a recess defined by the component of the wind turbine, wherein at least one of the wire races is in contact with the component and the plurality of rolling elements, and wherein at least one of the wire races is in contact with the single annular race and the plurality of rolling elements.

7. The bearing assembly of claim 6, wherein the plurality of rolling elements comprises at least two rows of rolling elements.

8. The bearing assembly of claim 7, further comprising at least one wire race arranged with each of the at least two rows of rolling elements.

9. The bearing assembly of claim 8, further comprising at least four wire races arranged with each of the at least two rows of rolling elements, thereby forming an eight-point contact bearing assembly.

10. The bearing assembly of claim 6, wherein the annular race is radially split.

11. The bearing assembly of claim 6, wherein the bearing assembly corresponds to at least of a pitch bearing or a yaw bearing of the wind turbine, and wherein the plurality of rolling elements comprises at least one of ball bearings or roller bearings.

12. The bearing assembly of claim 6, wherein the single annular race is disposed radially inward of the component and in axial alignment with the component.

13. The bearing assembly of claim 12, wherein the component is the hub of the wind turbine, and wherein the single annular race is coupled to a rotor blade of the wind turbine.

14. The bearing assembly of claim 12, wherein the component is the tower of the wind turbine, and wherein the single annular race is coupled to a bedplate of the wind turbine.

15. A main bearing assembly for a wind turbine, comprising;
a stationary component of the wind turbine, wherein the stationary component comprises one of a bedplate, a pillow block, or a housing of the wind turbine;
a rotatable component of the wind turbine rotatable relative to the stationary component;
only a single annular race, wherein the single annular race is rotationally fixed relative to the rotatable component;
a plurality of roller bearings positioned between the stationary component and the annular race adjacent to the rotatable component; and
at least one wire race arranged with the plurality of roller bearings, wherein the at least one wire race and at least a portion of each rolling element of the plurality of rolling elements are received by a recess defined by the stationary component of the wind turbine.

16. The main bearing assembly of claim 15, wherein the annular race is integrated with the rotatable component.

17. The main bearing assembly of claim 15, wherein the rotatable component comprises a hub of the wind turbine.

18. The main bearing assembly of claim 15, wherein the single annular race is disposed radially inward of the stationary component and in axial alignment with the stationary component.

19. The main bearing assembly of claim 18, wherein the stationary component has an axial length greater than or equal to an axial length of the single annular race.

20. The main bearing assembly of claim 18, wherein the stationary component is the pillow block, wherein the rotatable component is the main shaft, where in the main shaft is supported by the pillow block, and wherein the main bearing assembly comprises at least one of a fix bearing or a float bearing.

* * * * *